No. 883,572. PATENTED MAR. 31, 1908.
F. W. SAVAGE.
PNEUMATIC TIRE SHIELD.
APPLICATION FILED NOV. 10, 1905.

Witnesses
Edwin L. Jewell
A. W. Bunn

Inventor
Frederic W. Savage
by Percy B. Hills
Attorney

UNITED STATES PATENT OFFICE.

FREDERIC W. SAVAGE, OF GRANVILLE, NEW YORK.

PNEUMATIC-TIRE SHIELD.

No. 883,572.  Specification of Letters Patent.  Patented March 31, 1908.

Application filed November 10, 1905. Serial No. 286,731.

*To all whom it may concern:*

Be it known that I, FREDERIC W. SAVAGE, a citizen of the United States, residing at Granville, in the county of Washington and State of New York, have invented new and useful Improvements in Pneumatic-Tire Shields, of which the following is a specification.

My invention relates to protectors or shields for pneumatic tires, and has for its object to provide an improved chain armor that will offer an effective resistance to objects liable to puncture the tire, and will at the same time of itself conform to the circular outline of the tire.

My invention also embodies certain other novel features, as will be hereinafter more definitely pointed out and claimed, reference being had to the accompanying drawing, in which:—

Figure 1:
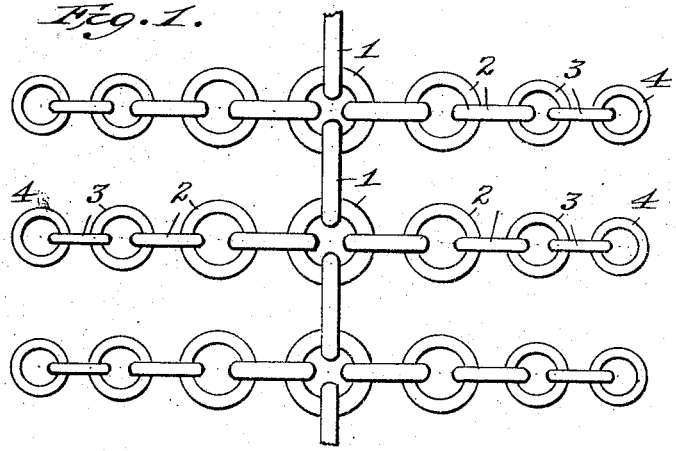
Figure 2:
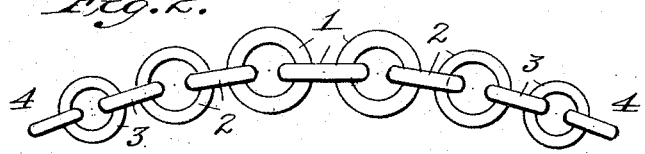
Figure 3:
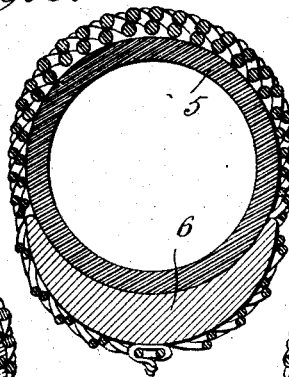
Figure 4:
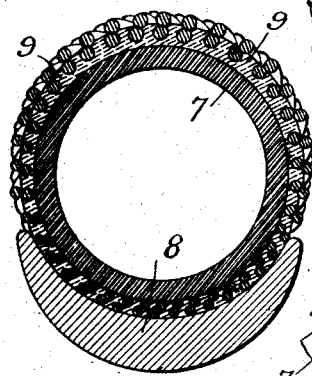
Figure 5:
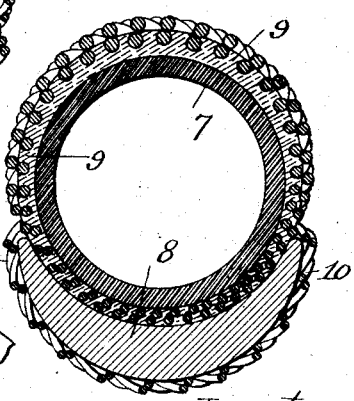
Figure 6:
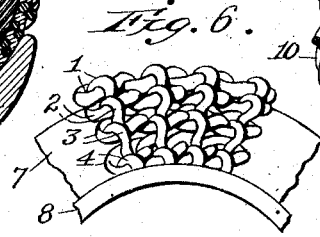

Figure 1 is an exaggerated diagrammatic view of my improved chain armor in the process of construction. Fig. 2 is a similar view in cross section. Fig. 3 is a transverse vertical sectional view through a tire and rim, and also through the shield. Fig. 4 is a view similar to Fig. 3, illustrating a slightly modified construction. Fig. 5 is a similar view illustrating still another modification. Fig. 6 is a detail side elevation of a portion of the tire, its rim, and my improved shield shown in Fig. 4.

My improved shield is formed of metal rings or links, the line of links comprising the extreme outer surface or tread of the shield being larger than the other links of the shield, the longitudinal lines of links gradually diminishing in diameter as they approach the rim of the wheel. Thus, in Figs. 1 and 2 I have shown the central line of links 1 of large diameter, the adjoining lines of links 2 being slightly smaller in diameter, this reduction in diameter continuing in the lines of links 3 and 4, as shown, until the wheel rim is reached. In Figs. 1 and 2 I have shown the shield diagrammatically in the process of construction, in which the variation in the sizes of the lines of links is somewhat exaggerated, and in which the longitudinal connecting links between the lines of links 2, 3 and 4 have been omitted. It will be understood, however, that when said longitudinal connecting links are inserted in place the lines of links 2, 3 and 4 will be progressively shorter than the line of links 1, which to be compensated for when the shield is located in position on the tire will cause said shield as a whole to assume the transversely curved outline shown in Fig. 2, conforming to the curvature of the underlying tire and closely embracing the same.

In the process of manufacture of the shield as above recited, said shield when all its links are adjusted then has all of said links flattened or twisted, in a manner well known in the manufacture of watch and other chains, said shield then presenting a substantially unbroken comparatively flat surface, as seen in Figs. 3, 4 and 5, that will present no interstices of sufficient size to permit the passage therethrough of articles liable to puncture the underlying tire.

In Fig. 3 I have shown my improved shield applied to a tire 5 already in position on its rim 6, the progressive reduction in the size of the links ceasing at the rim on each side, said shield being from there formed of links of uniform diameter, and passing around the underside of said rim and being suitably united on said underside.

In Fig. 4 I have illustrated a modified construction, the removable shield being placed on the tire 7 before the latter is located on the rim 8, said shield preferably having its inner surface embedded in a rubber coating 9, said rubber coating extending through to the outside of said shield throughout that portion of the shield that contacts with the rim 8, as shown.

In Fig. 5 I have illustrated still another modification, the construction being the same as that shown in Fig. 4, except that there is added to the shield a further securing means 10, made up of flattened links of even diameter and passing around the exterior of the rim 11, the same serving to firmly retain the shield in its proper position.

Having thus described my invention, what I claim as new and desire to secure by Letters Patent is:—

1. A removable shield for pneumatic tires, composed of interjoined links formed of round wire and sufficiently twisted to form a substantially unbroken and comparatively flat surface, adapted to cover the tire.

2. A removable shield for pneumatic tires, composed of interjoined links formed of round wire and sufficiently twisted to form a substantially unbroken and comparatively flat surface, the size of said links gradually diminishing from the line at the longitudinal center thereof towards each edge.

3. A removable shield for pneumatic tires, composed of links formed of round wire and interjoined both longitudinally and transversely and sufficiently twisted to form a substantially unbroken and comparatively flat surface, the longitudinal lines of links gradually diminishing in size from the longitudinal center of the shield towards each edge thereof.

4. A removable shield for pneumatic tires, composed of interlinked twisted links having the inner surface thereof embedded in a coating of rubber.

5. A removable shield for pneumatic tires, composed of interlinked twisted links adapted to completely surround the tire, and a supplemental portion composed of flattened links and attached to said shield and adapted to surround the wheel rim containing the tire.

In testimony whereof I have hereunto set my hand in the presence of two subscribing witnesses.

FREDERIC W. SAVAGE.

Witnesses:
H. J. STEVENS,
F. E. COLE.